Patented Dec. 17, 1946

2,412,909

UNITED STATES PATENT OFFICE 2,412,909

ORGANIC COMPOUNDS AND METHODS OF PREPARING SAME

Dwight James Potter, Allendale, N. J., assignor to Colgate-Palmolive-Peet Company, Jersey City, N. J., a corporation of Delaware No Drawing. Application April 24, 1942, Serial No. 440,396

15 Claims. (Cl. 260—513)

The present invention relates to a process of producing novel organic sulphur compounds and, more particularly, to a process of producing organic sulphur compounds having valuable detergent and foaming properties, and to the novel product of said process.

It is an object of the present invention to provide a novel process for preparing valuable detergent compositions.

It is another object of this invention to provide a novel process for preparing organic sulphur compounds from relatively inexpensive organic materials by reacting said materials with a halogen derivative of a lower oxidation product of sulphur in the presence of free radicals.

It is also an object of the invention to provide a new and inexpensive process for preparing organic sulphinate and/or sulphonate salts from organic materials, including saturated hydrocarbons obtained from petroleum oils.

The present invention also contemplates the provision of a simple and inexpensive method for making organic sulphinic acids and derivatives thereof for use in various chemical syntheses.

It is also within the contemplation of this invention to provide novel organic sulphinic acids and sulphinates and derivatives thereof.

The invention further provides novel organic sulphur compounds having valuable detergent, emulsifying and wetting properties.

Other objects and advantages of the invention will be apparent from the following description.

According to the present invention, organic compounds are reacted with a halogen derivative of a lower oxidation product of sulphur, such as the thionyl halides, and a compound capable of providing a free radical, that is, a particle having an unpaired valence electron, such as a halogen in the presence of actinic light, to form organic sulphur compounds, such as organic sulphinyl halides. Unreacted and by-product gaseous materials are then preferably removed, and the product is hydrolyzed with an alkaline agent and may optionally be oxidized to yield a sulphonate. If desired, the product may be reacted with other organic compounds to form secondary derivatives.

Although the mechanism of the reaction is not thoroughly understood, it is believed that the presence of a free radical, such as a nascent chlorine atom, acts upon the organic compound to strip off a hydrogen atom, forming hydrogen chloride, and to leave the organic residue as a free radical available for reaction with the organic sulphur compound. Thus, the following series of equations are suggested as a possible explanation of the reaction mechanism, although it will be understood that the present disclosure is neither bound thereby nor limited thereto:

(1) $\qquad Cl_2 \rightleftarrows 2Cl\cdot$
(2) $\qquad RH + Cl\cdot \rightarrow HCl + R\cdot$
(3) $\qquad R\cdot + SOCl_2 \rightarrow RSOCl + Cl\cdot$ Equation 1 indicates the dissociation of chlorine into two electrically neutral chlorine atoms or free radicals. Equation 2 represents the reaction of a chlorine atom or free radical upon an organic compound, wherein R represents an alkyl or substituted alkyl group linked to hydrogen. According to this suggested reaction mechanism, the chlorine atom splits the hydrocarbon molecule to form hydrogen chloride and to leave an alkyl or substituted alkyl free radical. The free hydrocarbon radical is thus available for reaction with thionyl chloride or other halogen derivative of a lower oxidation product of sulphur, and, as shown in Equation 3, an organic sulphinyl chloride and a free chlorine atom are produced. The free chlorine atom thus produced is then available for opening up another molecule of the organic compound for sulphination. If we consider only Equations 2 and 3, it would appear that chlorine serves merely as a catalyst in the reaction. However, the chlorine atom may react with a hydrocarbon free radical, as formed according to Equation 2, to produce a chlorine-substituted organic compound, such as an alkyl chloride, and thus be removed from the cycle of the reaction. It will be appreciated that this theory of reaction is not necessary to an understanding of the present invention, as disclosed herein, and that the same is advanced merely as an aid to the further development of the art.

When employing a thionyl halide as the reactant, a sulphinyl halide of the organic compound is formed. This product can then be hydrolyzed to yield a sulphinic acid or it may be hydrolyzed and neutralized to produce a salt thereof. The sulphination product, whether sulphinyl halide, sulphinic acid or sulphinate, can also be oxidized to the corresponding sulphonation product. The unoxidized product is soluble in alkali, but may separate out when the solution is acidified, whereupon it can be partially redissolved in alkali. Even in dilute solutions, the product shows unusual foaming, washing and wetting powers.

In selecting organic compounds for treatment according to the process of this invention, it is preferred to use aliphatic hydrocarbons of any desired number of carbon atoms to the molecule, to mix thionyl chloride therewith and to pass chlorine vapors into said mixture in very finely dispersed state in the presence of actinic rays. Satisfactory detergent compounds have been prepared from straight chain hydrocarbons having about 8 to about 26, and preferably about 12 to about 20, carbon atoms to the molecule. Cycloalkanes, alcohols, fatty acids, and other aliphatic organic compounds can also be sulphinated by this process.

The molar proportion of the organic compound to either the halogen derivative of the lower oxidation product of sulphur or the compound furnishing the free radical may be widely varied, as desired. However, when employing a thionyl halide and a halogen as the treating materials, as it is generally preferred to halogenate a minimum amount of the organic compound, it has been found advantageous to exceed the stoichiometric proportion of thionyl halide and to provide about 2 to about 5 mols of thionyl halide for each mol of organic material and, conversely, to use only about 0.2 to about 0.5 mol of halogen per mol of organic compound.

The treatment with thionyl halide and halogen is preferably carried out with thionyl chloride and chlorine at a temperature between about 25° C. and about 100° C. and for a length of time required for the desired degree of sulphination and of halogenation of the organic material. When reacting the materials in the upper part of this temperature range or higher, it is advantageous to operate under superatmospheric pressure or to reflux. Although it is preferred to use chlorine and thionyl chloride as treating agents, the halogen used may also be fluorine, iodine or bromine, and the thionyl halide may be a fluoride or bromide. Selenious or tellurous oxyhalides may replace the thionyl halide (sulphurous oxyhalide) as a reactant, and the corresponding oxychlorides, oxybromides and oxyfluorides are applicable for this purpose. The halogen may be replaced by other compounds capable of providing free radicals, such as lead alkyls under thermal decomposition, etc.

The sulphination product may be freed from unreacted material by heating to between about 100° and about 125° C. to remove gaseous reactants, and known methods, including fractional distillation, fractional crystallization, extraction and other separation procedures or any combination of these, may be employed for separating the product from non-gaseous reactants and impurities. A preferred method is to extract the organic sulphinyl halides with a selective solvent for separating them from unreacted hydrocarbons and/or hydrocarbon-like materials and from merely halogenated derivatives thereof. The organic sulphinyl halides are relatively soluble in solvents for polar compounds, whereas the unreacted or merely halogenated materials are insoluble or sparingly soluble therein.

Among the solvents which may be employed as preferential solvents in extracting the sulphination product from the reaction mixture are liquid sulphur dioxide, liquid carbon dioxide, nitroalkanes including nitromethane and nitroethane, dry ethyl alcohol, wet methyl alcohol, pyridine, furfuryl alcohol, furfural, glycolchlorhydrin, glycerol chlorhydrin, glycol, glycerol, dimethyl sulphate, diethyl sulphate, dibutyl sulphate, phenol, methyl formate, glycol monoformate, glycol diformate, ethyl formate, formic acid, methyl acetate, glycol monoacetate, glycerol monoacetate, acetic acid, acetic anhydride, acetonitrile (methyl cyanide), dichlordiethyl ether, trimethyl amine, trichlormethyl chlorformate, phosgene, stannic chloride, liquid hydrogen fluoride, liquid hydrogen chloride, boron trifluoride dihydrate, nitrobenzene, 1-nitropropane, 2-nitropropane, cresol, sulphur monochloride and various miscible mixtures of the foregoing solvents, the last five named being more effective when used at low temperatures. Of these solvents, some, such as the nitro compounds, have a slight oxidizing effect and thus tend to oxidize certain organic sulphinyl halides to sulphonyl halides; this tendency may or may not be of advantage, depending upon whether organic sulphonates or sulphinates are desired. The use of alcohols as preferential solvents, as disclosed supra, may cause the esterification of the sulphinyl halides, but, except for possible loss of alcohol thereby in the succeeding hydrolysis, the subsequent operations are not affected to any disadvantageous extent. When using some of the aforementioned compounds, such as the alcohols or acids, as selective solvents for the sulphinyl halides, it is desirable to have the reaction mixture substantially free of thionyl halide before extracting in order to avoid side reactions. With most of the solvents disclosed, the extraction may be carried out before or after heating to remove thionyl halide.

The organic sulphinyl halides may be extracted with a preferential solvent, with or without the addition of an adjuvant solvent or solvents immiscible or only slightly miscible with the preferential solvent. Liquid alkanes of low molecular weight, such as propane, butane, pentane, hexane, heptane, octane, nonane, and petroleum ether, and other substantially non-polar solvents and mixtures thereof may be added to the reaction mixture as adjuvant solvents in this connection before, after and/or simultaneously with the preferential solvent. The use of a non-polar solvent substantially immiscible with the preferential solvent provides greater selectivity, removal of the last traces of "non-sulphinated" material from the polar solvent solution, and the maintenance of high-melting raffinates in a liquid condition when employing low-temperature operation.

By treating with a preferential solvent, a polar-preferential solvent phase is formed, which can then be separated from the residue by drawing off, decanting and/or centrifuging. Substantially all impurities are thereby removed, and the organic sulphinyl halides thereafter separated from the preferential solvent are substantially pure and consequently more desirable because of the unimpaired detergent properties of the sulphinates and/or sulphonates derived therefrom. The low-boiling solvents, such as methyl formate or liquid sulphur dioxide, may be readily separated from the organic sulphinyl halides by vaporization and may be condensed and reused for treatment of additional material or for any other purpose.

A preferred extraction procedure may be performed by adding about an equal volume of an oxygen-containing preferential solvent for the polar sulphinyl halides, such as methyl formate or liquid sulphur dioxide, to the organic sulphinyl halide reaction mixture and then an equal volume of immiscible non-polar solvent, such as hexane. The order of adding the solvents may be reversed, or they may be used simultaneously. The mixture separates sharply into two liquid phases. One of the phases consists mainly of polar solvent and contains the major portion of the organic sulphinyl halide, and the other phase contains the non-polar solvent solution of hydrocarbon-like material and halogenated derivatives thereof. The oxygenated solvent layer, e. g., liquid sulphur dioxide, is usually more dense than the non-polar solvent layer, e. g., hexane; hence, the latter forms the upper layer. It is desirable to form layers having widely different specific gravities in order to promote separation. Either solvent may be replaced by substantially miscible mixed solvents performing in a manner substantially similar to the solvent replaced.

The polar solvent phase, such as the methyl formate or liquid sulphur dioxide layer, may be separated by known methods, such as drawing off, decantation, centrifuging or the like, and will be found to contain most of the organic sulphinyl halides. It may be rewashed with additional non-polar solvents, such as hexane, to cause more complete purification. The non-polar solvent solution contains most of the impurities and may be successively extracted or washed with additional polar solvent until it is substantially free of organic sulphinyl halides. These non-polar solvents, which are immiscible and non-reactive with the preferential solvent for the sulphinyl halides under the reaction conditions, will assist in removing non-sulphonated materials, e. g., aromatics, olefins and the like, which are somewhat soluble in the liquid sulphur dioxide or other polar solvent but which are less polar than the sulphinyl halides.

Continuous extraction procedures, as by dilution of the mixture with one solvent and countercurrent washing with the other solvent, may be effectively and economically carried out. It is also contemplated that one or more preferential solvents, such as liquid sulphur dioxide with an alkyl sulphate, may be employed, either with or without one or more other solvents which are soluble in the selected polar solvent phase and which will increase the solubility of the organic sulphinyl halides contained therein or will depress the solubility of the impurities in the polar solvent.

The extraction may be carried out in simple, single or multiple contact; countercurrent multiple contact, and continuous countercurrent contact. Using either of the two last mentioned, backwash or reflux operation is preferably employed to obtain thorough extraction. It is even possible to conduct the continuous extraction procedure simultaneously with the formation of sulphinyl halides, although this may be undesirable where the solvent or solvents employed enter into reaction with the starting materials or products under the reaction conditions. The extraction of the impure sulphinyl halide product can be conducted in several stages wherein the mixture is first extracted with one solvent and the raffinate thereof extracted with the second solvent, or the solvent-free extract from the first stage of extraction may be re-extracted with a second solvent. This solvent may be recovered from the extract and/or the raffinate by extraction with a suitable secondary solvent therefor. Extraction with a secondary solvent of relatively low boiling point is particularly desirable in those cases where the primary extractant is high-boiling. The solvents may be recovered directly from the extract, from the raffinates or from the secondary solvents by any suitable method, including distillation, evaporation, crystallization, salting-out or the like. The recovered solvents may then be reused for fresh materials.

The organic sulphinyl halides are preferably recovered from the selective solvent by removal of the solvent in gaseous form. Thus, the removal of solvents having a low boiling point may be accomplished by bubbling an inert gas, such as carbon dioxide, nitrogen, stack gases, etc., through the mixture and/or by gentle heating and/or by other means. Suitable equipment may be provided for carrying out these operations, whereby the volatility of the low-boiling solvent, such as liquid sulphur dioxide, may be increased, as by reducing the pressure in the system. Such equipment may also be provided with condensing means, whereby the volatilized sulphur dioxide and/or other solvents employed may be recovered for reuse.

The sulphinyl halide product, thus freed by extraction or otherwise from unreacted material and impurities, may then be hydrolyzed with water or with aqueous solutions of salts and/or acids or alkalies, and preferably with an alkaline agent, such as a caustic solution. The use of an alkaline agent permits neutralization along with hydrolysis. Excess gaseous reactants, by-products and/or other gaseous material, if still present, may be removed from the sulphination product, before or after hydrolysis, by blowing with substantially inert gases, such as nitrogen, carbon dioxide, sulphur dioxide, flue gases and/or steam. Air or other oxygen-containing gas may be similarly employed, where the product is ultimately to be oxidized to the sulphonate.

The hydrolyzed product may be extracted with ether, gasoline or the like to remove any residual organic unsaponifiable material therefrom. Inorganic salts added or formed during hydrolysis and/or neutralization may be removed by extraction of the product with ethyl alcohol, butyl alcohol and the like, or the solution may be dialyzed to obtain this result. Since certain inorganic salts which may be present, such as sodium chloride, are soluble to an appreciable extent in these solvents, the hydrolyzed products may be purified by adding an amount of a water-immiscible organic solvent, such as benzol, toluol, or the xylols, capable of dissolving the salts of the organic sulphur compounds in the anhydrous state, but incapable of dissolving appreciable amounts of the inorganic salts. The mixture is heated to boiling to vaporize both the water and the organic solvent, and the vapors are condensed and separated. In this manner, the water can be removed from the condensate, while the water-immiscible solvent is permitted to flow back into the boiling mixture. Reflux distillation is continued until no more water separates, at which time the organic solvent is the only liquid which remains in the distillation vessel. The organic solvent containing the organic sulphur compounds in solution therein is then separated from the undissolved inorganic salts by filtration, decantation, and/or centrifuging or the like, and the solvent is thereafter removed by known methods.

While the reaction may be carried out between broad temperature limits, such as from about −10° C. and below to about 200° C. and above, it is advantageous to conduct the sulphination between about 25° C. and about 100° C. The preferred temperature range may be effected by applying suitable controls, depending upon the rate of reaction and the heat evolved. Thus, the reactants, diluents and/or vapors may be preheated or precooled, the admixed liquids may be vaporized, and/or external heating or cooling of the reaction mixture may be provided. It is advantageous to maintain the preferred temperature range, which may vary for different materials, since, with certain raw materials, the products tend to decompose, to polymerize, to discolor and/or to develop an undesirable odor at higher temperatures. In such cases, temperature control is very important in the production of materials of uniform properties.

The sulphination reaction is affected by many factors, including the concentration of the reactants, the time of treatment, the reaction temperature, the pressure, the organic materials being treated, and the type and intensity of illumination or radiation employed to catalyse the reaction. Light rays from that portion of the spectrum extending from the blue to the ultraviolet are particularly effective in assisting the reaction.

The process may be continuously carried out, preferably by continuously passing the organic material to be sulphinated downwardly in an illuminated vessel in countercurrent flow to a heated rising gas mixture including the thionyl halide and halogen. If the thionyl halide is a liquid at the particular temperature employed, it may be passed downwardly in concurrent flow with the organic material. Similarly, if the organic material is in the gaseous state, it may be passed upwardly in contact with the other reactants. The reaction is preferably carried out in a tower containing a column of inert material capable of transmitting light, such as rings, beads, bubble plates, fibers, and/or various other shapes of glass, plastic, fused silica, quartz and other like materials. The sulphinated product may then be continuously or intermittently removed from the bottom of the tower and may be continuously or intermittently hydrolyzed and purified. Where a solvent or solvents are used to extract the reaction product, these may be introduced into the top of the tower along with the reactants, as aforesaid, if desired.

The sulphination products formed are readily susceptible to oxidation, especially after hydrolysis, to form sulphonic acids or sulphonic acid derivatives. The oxidation may be accomplished by any of a variety of means, with or without oxidation catalysts. A convenient method is to blow air or other oxygen-containing gas through the sulphinated material, and oxidation may thus be advantageously combined with removal therefrom of excess gaseous reactants, by-products and/or other gaseous material by blowing, described supra. Other oxidizing agents, including nitric acid, the oxides of nitrogen, hydrogen peroxide and other peroxides, chlorates, perchlorates, persulphates, perborates, etc., and/or mixtures thereof, may also be used, with or without air blowing.

The sulphination products may also be reacted with other organic compounds to form secondary derivatives. Thus, the sulphinates readily react with alkyl halides to form sulphones, and the organic sulphinyl halides react with amines, phenols, alcohols, aromatic hydrocarbons and derivatives thereof, beta-keto-esters and other active methylene compounds, etc. These secondary derivatives are, like the sulphination products themselves, useful as reducing and bleaching agents, and they are also useful as dyes, plasticizers, tanning agents, drugs, medicaments, stimulants, vesicants, poison gases and industrial chemicals.

In preparing the valuable detergents and foaming agents of the present invention, the straight chain saturated aliphatic hydrocarbons have been found to provide satisfactory sulphination products (and/or sulphonation products, after oxidation), as aforesaid. A particularly desirable source of this material is in the petroleum fractions generally described as gas oil fractions. Paraffin base gas oils, such as are recovered from crudes of the Pennsylvania and Michigan fields, are particularly desirable, and the individual constituents of these gas oils, such as those having from about 12 to about 20 carbon atoms, and especially the straight chain saturated hydrocarbons of this class, including n-heptadecane, n-tetradecane, n-docosane and cetane, provide very satisfactory sulphination products for the present purpose. However, either virgin or cracked gas oil of paraffinic, asphaltic and/or naphthenic base or mixtures thereof may be used.

The gas oil or other petroleum fractions may be purified or concentrated by any of the known procedures before sulphinating. For example, the boiling range of the gas oil may be narrowed by fractional distillation, preferably under vacuum and in the presence of caustic soda or other bases. The gas oil may be given a preliminary treatment with a small amount of oleum or concentrated sulphuric acid or the like to remove resin-forming and other unstable constituents therefrom. It may also be admixed with filter clay, silica gel, or decolorizing carbon, which materials may be separated therefrom by settling, centrifuging, and/or filtering. A particularly desirable treatment for obtaining better results includes solvent extraction to remove the more aromatic and/or unsaturated constituents of the gas oil, although the removed constituents, including olefinic and cycolapihatic materials, may also be treated by the process of the present invention.

Among the materials which may be treated alone or along with one or more of the saturated aliphatic hydrocarbons or their mixtures, such as gas oils, are paraffin hydrocarbons, including butane, dodecane, hexane, heptadecane, octadecane and hexadecane; petroleum hydrocarbons, including paraffin wax, slack wax, scale wax, Asiatic wax, white oil, kerosene, lubricating oils and raffinates of lubricating oil and kerosene extractions; hydrocarbons produced by the hydrogenation of oxides of carbon; hydrogenated coal; olefines, including decene, hexene, cetene and dodecene; tetraisobutylene and other polymerized olefines; cyclic compounds, including decalin, cyclohexane, methyl cyclohexane, dodecyl cyclohexane and cyclohexene; sterols, including cholesterol, phytosterol and the like; resins and fatty acids and their monohydric and full and partial polyhydric alcohol esters, including stearic acid, rosin, spermaceti, tallow, tall oil and monoglycerides of coconut oil; alcohols and their derivatives; the halogen and other substituted derivatives of these materials, including chlorinated paraffin wax, chlorinated gas oil, cetyl chloride and olefine halides; and various other aliphatic or cycloaliphatic materials and mixtures thereof. It is preferred to treat the less expensive and more available saturated aliphatic materials. Where organic carboxylic acids are treated in accordance with the present invention, an amount of thionyl halide sufficient to form the carboxylic acid halide and then to convert this intermediate product to the sulphinyl halide is employed. When alcohols are treated, a sufficient excess of thionyl halide to form alkyl halides and/or sulphites and then to produce sulphinyl halides therefrom is used.

The products may be in the form of the acids or the salts of sodium, potassium, calcium, magnesium, aluminum, ammonia, mono-, di-, and triethanolamine, amino-trimethylol-methane, amyl-amines, methyl-amines, aniline, pyridine and like metals or compounds. The bases corresponding to the above metals or compounds may be used for saponifying the sulphination products. The salts may be interchanged by the treatment of a solution of one salt of the novel compounds in a solvent, such as acetone, ethyl alcohol, isopropyl alcohol, butyl alcohol, dioxane, monoglycerides, Cellosolve and Carbitol, with a concentrated aqueous solution of a soluble salt of an inorganic acid having a different cation from that of the product to be treated. This process also serves to remove from the product the inorganic salts, such as sodium chloride.

The following examples, described herein, are merely illustrative of the present invention, and it will be understood that the invention is not limited thereto.

*Example I*

About 45 grams of an acid-refined gas oil of paraffinic base having a boiling range of about 500° to about 700° F. are mixed with about 71 grams of thionyl chloride, and the mixture is placed in a reaction vessel illuminated by a 250 watt, type H-2, General Electric mercury vapor lamp placed about 3 inches away. About 71 grams of gaseous chlorine are slowly passed into the mixture over a period of about six and one-half hours. The temperature rises rapidly at first and is maintained at about 75° C., the color of the mixture remaining a light yellow during this period. The mixture is thereafter heated to about 115° C. and blown with nitrogen to expel unreacted thionyl chloride. Aqueous sodium hydroxide is then added, and the mixture is heated, causing a very vigorous hydrolysis to take place. The mixture is extracted with gasoline to remove unsaponifiable material therefrom. A quantity of benzol is then added, and the mixture is refluxed, using a trap to remove water from the condensate before returning it to the distillation vessel, whereby inorganic salts are precipitated. After decanting, the benzol is removed by distillation, leaving an amorphous product. The product is readily soluble in water, and even dilute solutions show unusual foaming and detergent properties.

*Example II*

About 84 grams of cyclohexane are mixed with about 119 grams of thionyl chloride in a glass vessel. The mixture is treated with about 35 grams of gaseous chlorine over a period of about two and one-half hours, while exposed to a mercury arc lamp. Excess gases are blown out of the reaction mixture with carbon dioxide, and the mixture is distilled in glass apparatus. The material is heated to about 50° C. under 40 millimeters of mercury absolute pressure, and thionyl chloride and unreacted cyclohexane are thereby removed. The distillation temperature is then raised, collecting a minor fraction between about 60° and about 70° C., the fraction largely comprising chlorcyclohexane. The system is further evacuated to about 3 to about 4 millimeters of mercury pressure, and the temperature is increased. A major fraction, boiling between about 85° and about 110° C., is collected, a last fraction between about 110° and about 115° C. showing signs of decomposition. The major fraction comprises cyclohexyl sulphinyl chloride, a light yellow oil with a characteristic odor. A portion of this product is hydrolyzed with sodium hydroxide and, on cooling, is crystallized out in flat, shiny flakes. Another portion of the product comprising cyclohexyl sulphinyl chloride decolorizes dilute potassium permanganate, dilute aqueous iodine and aqueous bromine solutions. Bromine dissolved in carbon tetrachloride is not decolorized.

The cyclohexyl sulphinyl chloride reacts violently with sodium peroxide, being neutralized and oxidized to form the sodium sulphonate. The sodium salt of the sulphonated product is readily soluble in water and in alkaline solutions and has excellent detergent, wetting, emulsifying and foaming properties.

*Example III*

About 242 grams of a Pennsylvania white mineral oil are mixed with about 120 grams of thionyl chloride in a glass vessel, and chlorine gas is slowly bubbled in at a rate such that substantially all of the gas is absorbed before reaching the surface of the reaction mixture. A mercury vapor lamp at a distance of about 3 to about 4 inches from the vessel provides illumination to catalyze the reaction. The mineral oil and the thionyl chloride are precooled, and a temperature of about −10° to about +10° C. is maintained throughout the entire run. When about 35 grams of chlorine have been added, about 120 grams more of precooled thionyl chloride are added, and the chlorine addition is continued until about 35 grams more are consumed. At the end of three hours, carbon dioxide is bubbled through the reaction mass to sweep out excess gases, and a crude product containing sulphinyl chlorides is obtained as detailed in the preceding examples. Upon hydrolysis with a 5% solution of sodium hydroxide, a vigorous reaction ensues, and the sodium salts of the mineral oil sulphinic acids are obtained. The sodium salts are isolated from the aqueous solution by a benzol boiling, as in Example I.

*Example IV*

About 7 parts by weight of a Pennsylvania white mineral oil and about 10 parts by weight of thionyl chloride are run continuously into a glass reaction vessel containing transparent beads, and about 1 part of chlorine gas is slowly bubbled into the vessel in countercurrent to the down-flowing liquids. The mineral oil and the thionyl chloride are preheated to an extent sufficient to maintain a temperature of about 45° to about 65° C. in the reaction vessel, and a mercury vapor lamp about 3 inches from the vessel provides a source of actinic light. A mixture of the sulphinyl chloride product, chlorinated oil, unreacted oil, and excess thionyl chloride is withdrawn at the bottom of the vessel and passed to the central portion of an extraction column. A volume of liquid sulphur dioxide about twice that of the mixture is fed into the column at the top. The liquid sulphur dioxide dissolves the reaction product and excess thionyl chloride and is removed at the bottom of the column, while unreacted and/or merely chlorinated oil is taken off at the top. The sulphur dioxide solution is then subjected to vacuum distillation, maintaining a vacuum of about 28 inches, and the sulphur dioxide and excess thionyl chloride are separately condensed and recovered for reuse. The sulphinyl chloride reaction product is thereafter hydrolyzed, as described in preceding examples, yielding the sodium salts of mineral oil sulphinic acids.

Example V

About 219 grams of lauroyl chloride are mixed with about 119 grams of thionyl chloride in a glass vessel, and about 35 grams of chlorine are passed into the mixture during a period of about five hours. The reaction mixture is exposed to light from a mercury arc lamp throughout the reaction. The mixture is distilled at about 120° C. under an absolute pressure of about 20 millimeters of mercury, while passing a stream of nitrogen therethrough. Excess gases and thionyl chloride are thereby removed. The residue containing unreacted lauroyl chloride and lauroyl chloride sulphinyl chloride is hydrolyzed and neutralized with sodium hydroxide, and a stream of oxygen is then bubbled through the material to oxidize the sulphinated product to the disodium salt of a sulphonated lauric acid. This product is in admixture with sodium laurate formed from unreacted lauroyl chloride. A portion of this mixture is separated from inorganic salts by the procedure described in Example I. Another portion of the product is salted out to yield a substantially salt-free material.

Example VI

About 141.5 grams of cyclohexane are mixed in a reaction tube with about 202 grams of thionyl chloride, and means for maintaining the temperature of the reaction mixture at about 10° to about 20° C. are provided. A general Electric type H-2 mercury vapor lamp located at a distance of about 3 inches from the tube is employed to illuminate the mixture, and about 65 grams of chlorine are bubbled in through a fritted glass gas distributor over a period of about two hours. At the end of this time, the lamp is turned off and the mixture is blown with carbon dioxide gas to sweep out hydrogen chloride and unreacted chlorine. The reaction mixture is heated to about 100° to about 110° C. under an absolute pressure of about 250 millimeters of mercury and in a carbon dioxide atmosphere, a distillate being collected which smells strongly of thionyl chloride and which also contains a major part of the unreacted cyclohexane. The residue is distilled in vacuo at a pressure of about 1 to about 2 millimeters of mercury, and a fraction boiling between about 60° and about 90° C. is recovered.

About 5 grams of this fraction is treated with about 6 cc. of 5N sodium hydroxide. A vigorous reaction ensues, resulting in the formation of a mass of colorless crystals. The crystals are washed with ether, filtered and dried. About 2.38 grams of said crystals are then boiled for about five hours in a n-butanol with about 2.11 grams of p-nitrobenzyl bromide. The reaction mixture is then filtered, and the filtrate is allowed to cool. Crystals are obtained which are then taken up with ethanol and are recrystallized therefrom, the crystalline product melting sharply at about 176° to 177° C.

Para-nitrobenzyl cyclohexyl sulphone is then prepared synthetically in the following manner: About 13.5 grams of magnesium turnings are treated with about 62.5 cc. of cyclohexyl bromide in about 250 cc. of dry ether to make a Grignard reagent. About 100 cc. of liquid sulphur dioxide dissolved in about 200 cc. of ether are then added thereto. A solid separates during the addition and is redissolved in excess sulphur dioxide-ether solution. The mixture is thereafter poured upon crushed ice, and magnesium carbonate is added to the resulting solution to raise the pH from about 1 to about 5, causing separation of a solid. The solid is filtered off and air-dried. About 25 grams of this solid is digested with about 100 cc. of water and about 20 grams of sodium carbonate, and the mixture is evaporated to dryness. The resulting powder is extracted with alcohol, and the extract is evaporated down until crystals begin to form, whereupon ether is added to the solution. Fine, white leaflets of the sodium sulphinate are thereby caused to separate, and these are put in a flask with about 2.35 grams of p-nitrobenzyl bromide and n-butanol. The mixture is refluxed for about five hours and is then filtered hot. The filtrate is allowed to cool, and glistening, colorless leaflets of p-nitrobenzyl cyclohexyl sulphone separate therefrom. These crystals are taken up with ethanol and are recrystallized therefrom. The pure crystals thus obtained are found to melt sharply at about 176° to 177° C. A mixture of these crystals with the crystalline product obtained by the treatment of cyclohexane with thionyl chloride and chlorine and subsequent hydrolysis, neutralization and reaction with p-nitrobenzyl bromide is prepared, and the mixture also melts sharply at about 176° to 176.5° C., showing that the two substances are identical. In this manner, it is indicated that the product obtained by reaction of cyclohexane with thionyl chloride and chlorine is cyclohexyl sulphinyl chloride, which, upon hydrolysis and neutralization with sodium hydroxide, yields cyclohexyl sulphinic acid sodium salt.

Similarly, symmetrical di-cyclohexylsulphonylethane is synthetically prepared by means of the Grignard reaction and is compared with crystals obtained by reacting about 3 grams of sodium cyclohexyl sulphinate prepared by the process of this invention with about 5 cc. of ethylene bromide. Each crystalline product, as well as a mixture of the two, melts at about 155° C.

The sulphinate and sulphonate products obtained according to the present invention have good wetting, solubilizing, deterging, sudsing, water-softening, dispersing, emulsifying, penetrating, and equalizing properties. Although these products may advantageously be used in hard as well as in soft water, whether hot or cold, and in the presence or absence of large quantities of inorganic salts, such as sodium chloride and sodium sulphate, it is generally preferred to employ the sulphonate products for use in hard water. The sulphinate and/or sulphonate products herein disclosed may also be used in admixture with other wetting and emulsifying agents, including alkali metal, ammonium and amine soaps of fatty acids, resins, long chain alcohol sulphates, monoglyceride monosulphates, sulphonated mineral oil extracts and Turkey red oil, lecithin, glycerolamines, monoethanolamine, diethanolamine and triethanolamine and their soaps; alkaline soap builders, water softeners, and other salts including borax, sodium carbonate, silicates, phosphates, tetraphosphate, pyrophosphate, hexametaphosphate, sulphate, chloride, acetate, citrate, tartrate, bicarbonate, sesquicarbonate, thiosulphate, and hydrosulphite, and their other alkali metal, ammonia, and amine salts or alkyl esters; acids, including boric acid, citric acid and tartaric acid; coloring matter, including dyes, lakes, pigments; abrasives and fillers, including silica, pumice, feldspar, precipitated chalk, infusorial earth, bentonite, talc, starch, and air; liquids, including carbon tetrachloride, perchlorethylene, trichlorethylene, glycerine, ethyl alcohol, tetrahydrofurfuryl alcohol, phenol, cyclohexanol, water, tetralin, decalin, pine oil, mineral oil, mineral oil extracts, and naphtha; perfumes and deodorants; fats, oils, fatty acids, monoglycerides, vitamins, waxes, gums, glue, resins; germicides, including phenol, mercuric chloride, phenyl mercury nitrate, phenyl mercury chloride; and/or styptics, such as aluminum chloride, adrenalin and cephalin. The type of addition agent to be used will depend, of course, upon the ultimate use of the new compositions.

The final composition, with or without one or more addition agents, may be formed into beads, flakes, bars, chips, crystals, powders, solutions, liquid or plastic emulsions, pastes, creams, salves, or any other forms desired. The ingredients may be mixed by any of the common methods, such as grinding, stirring, kneading, crutching, fusing, and drying of mixed solutions or dispersions by heated rolls, spraying or other means.

The various products and compositions of this invention may be used for various purposes, such as laundry detergents and other textile agents including laundry blueing, bleaching, dyeing, mercerizing, softening, lubricating, and discharging compositions; drain, lavatory and radiator cleaners; anti-oxidants for soaps and other compositions; reducing agents; paint, stain and grease removers; dry-cleaning compositions; rug cleaners; water softeners; washing compositions for fruit, fabric, wood, metal, stone, glass, brick, masonry, and alkali sensitive and/or painted surfaces; liquid, solid and paste tooth and mouth detergents; shampoos; cosmetics; depilatories; deodorants and perfumes; antiseptics; insecticides; dust-preventing compositions; fire extinguishing compositions; anti-freezing, anti-fogging, and anti-corrosion compositions; wood impregnants; electrolytic baths; metal plating; metal pickling; etching compositions; tanning agents and fat-liquors for leather; photographic solutions; petroleum de-emulsifying compositions; lubricating oil and fuel compositions; ore flotation; fat splitting; cements and plastic compositions; abrasive compositions; water paints and polishes; sizes, glues, and adhesives, such as shellac and casein compositions; preparation of dyes and dye intermediates; preparation of germicidal agents; preparation of resins and plasticizers, such as suphonamids and substituted sulphonamids and the sulphonamid-aldehyde condensation products; and any compositions requiring wetting, washing, emulsifying, penetrating, solubilizing, dispersing and like agents.

Although the present invention has been described with respect to particular embodiments, it will be appreciated that equivalents can be used and that variations and modifications of the invention can be made without departing from the spirit thereof. Thus, although this invention has been particularly described with reference to reacting organic compounds with sulphurous oxyhalides, it will be understood from the foregoing that other halogen derivatives of lower oxidation products of sulphur may instead be used. For example, sulphur halides, such as sulphur monochloride, sulphur monobromide, and sulphur dichloride, may be employed as reactants with the organic compounds set forth herein as starting materials to form organic sulphur compounds. These and other variations and modifications are believed to be within the scope of the present specification and within the purview of the appended claims.

I claim:

1. The process of preparing sulphinic derivatives of organic compounds which comprises treating an organic compound having an aliphatic group with a thionyl halide and a minor proportion of a halogen in the presence of actinic rays.

2. The process of preparing sulphinic derivatives of organic compounds which comprises treating an organic compound having an aliphatic group with thionyl bromide and a minor proportion of a halogen in the presence of actinic light.

3. The process of preparing sulphinic derivatives of organic compounds which comprises treating an organic compound having an aliphatic group with thionyl chloride and a minor proportion of a halogen in the presence of actinic light.

4. The process of preparing suphinic derivatives of organic compounds which comprises treating an organic aliphatic compound with thionyl chloride and a minor proportion of chlorine in the presence of actinic light.

5. The process of preparing sulphinic derivatives of organic compounds which comprises treating an organic aliphatic compound with thionyl chloride and a minor proportion of bromine in the presence of actinic light.

6. The process of preparing sulphinic derivatives of organic compounds which comprises treating an organic aliphatic compound with a thionyl halide and a minor proportion of a halogen in the presence of actinic light to form organic sulphinyl halides, and removing said organic sulphinyl halides with a selective solvent therefor.

7. The process of preparing sulphonic derivatives of organic compounds which comprises treating an organic aliphatic compound with a thionyl halide and a halogen in the presence of actinic light to form an organic sulphinic derivative, and oxidizing said sulphinic derivative.

8. The process of preparing sulphonic derivatives of organic compounds which comprises treating an organic acyclic compound with thionyl chloride and chlorine in the presence of actinic light to form an organic sulphinic derivative, and oxidizing said sulphinic derivative.

9. The process of preparing sulphinic acid derivatives of organic compounds which comprises treating an organic aliphatic compound with a thionyl halide and a minor proportion of a halogen in the presence of actinic light to form an organic sulphinyl halide, and hydrolyzing said organic sulphinyl halide.

10. The process of preparing organic sulphinates which comprises treating an organic aliphatic compound with thionyl chloride and a minor proportion of chlorine in the presence of actinic light to form an organic sulphinyl chloride, and hydrolyzing and neutralizing said organic sulphinyl chloride with an alkaline material.

11. The process of preparing organic sulphonates which comprises treating an organic aliphatic compound with thionyl chloride and chlorine in the presence of actinic light to form an organic sulphinyl chloride, hydrolyzing and neutralizing said organic sulphinyl chloride with an alkaline material to form an organic sulphinate, and oxidizing said organic sulphinate.

12. The process of preparing sulphinic derivatives of organic compounds which comprises treating an organic aliphatic compound having about eight to about twenty-six carbon atoms with a thionyl halide and a minor proportion of a halogen in the presence of actinic light.

13. The process of preparing sulphinic derivatives of organic compounds which comprises treating an organic aliphatic compound having about twelve to about twenty carbon atoms with thionyl chloride and a minor proportion of a halogen in the presence of actinic light and at a temperature of about $-10°$ to about $200°$ C.

14. The process of preparing organic sulphinates which comprises treating an organic aliphatic compound having about twelve to about twenty carbon atoms with thionyl chloride and a minor proportion of chlorine in the presence of actinic light and at a temperature of about $25°$ to about $100°$ C. to form organic sulphinyl chlorides, and hydrolyzing and neutralizing said organic sulphinyl chlorides with an alkaline material.

15. The process of preparing organic sulphonates which comprises treating an organic aliphatic compound having about twelve to about twenty carbon atoms with thionyl chloride and chlorine in the presence of actinic light and at a temperature of about $25°$ to about $100°$ C. to form organic sulphinyl chlorides, hydrolyzing and neutralizing said organic sulphinyl chlorides with an alkaline material to form organic sulphinates, and oxidizing said organic sulphinates.

DWIGHT JAMES POTTER.